No. 886,096. PATENTED APR. 28, 1908.
H. VARDER.
MUSIC LEAF TURNER.
APPLICATION FILED JUNE 28, 1906.
2 SHEETS—SHEET 1.
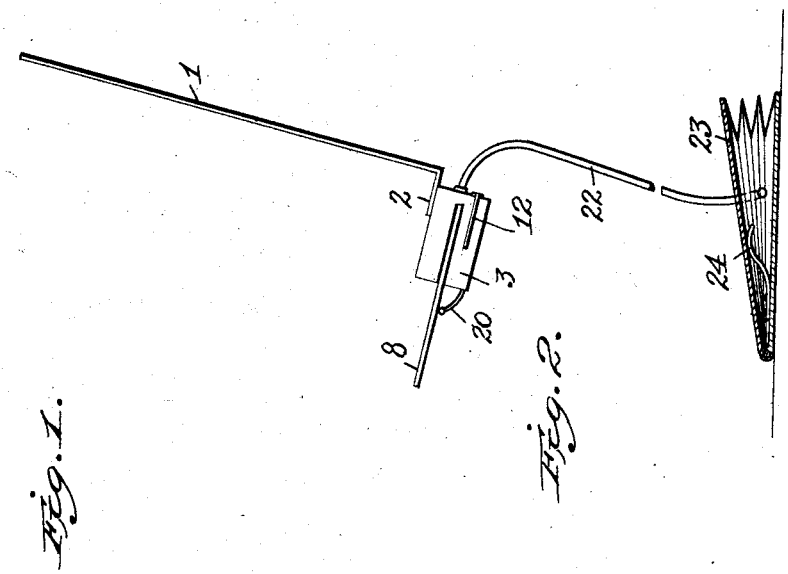
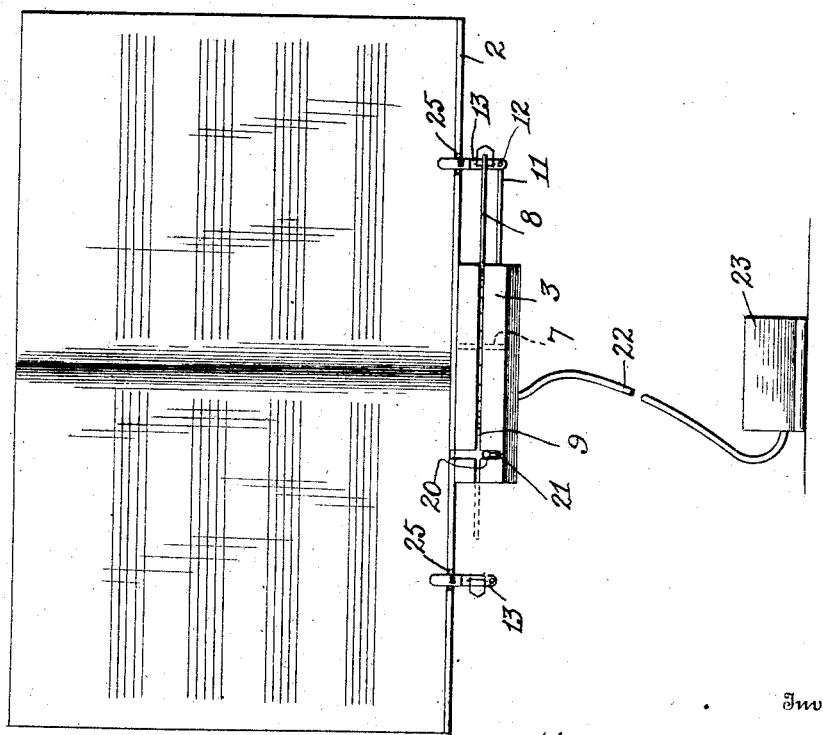

No. 886,096. PATENTED APR. 28, 1908.
H. VARDER.
MUSIC LEAF TURNER.
APPLICATION FILED JUNE 28, 1906.
2 SHEETS—SHEET 2.
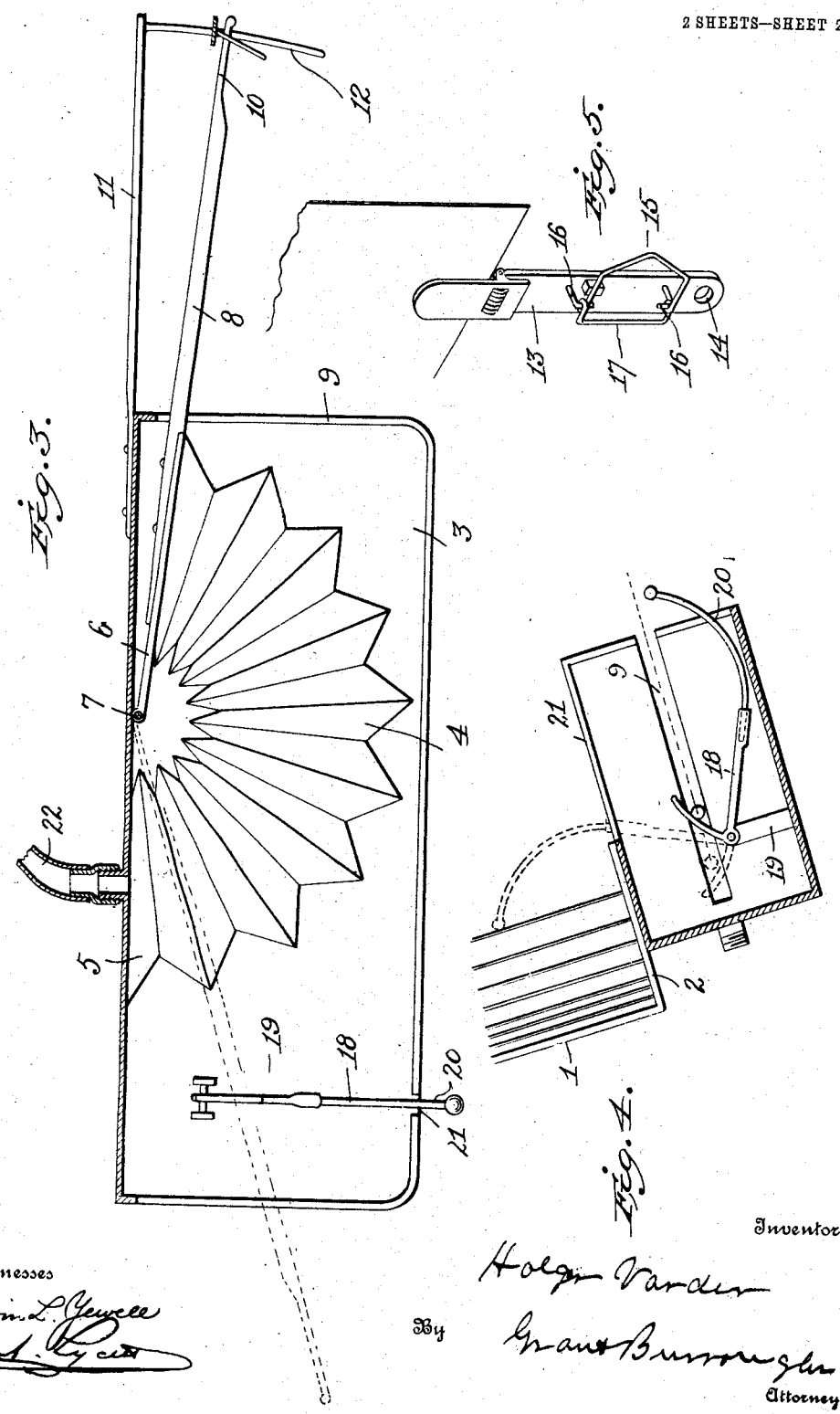

UNITED STATES PATENT OFFICE.

HOLGER VARDER, OF BALTIMORE, MARYLAND.

MUSIC-LEAF TURNER.

No. 886,096.      Specification of Letters Patent.      Patented April 28, 1908.

Application filed June 28, 1906. Serial No. 323,880.

*To all whom it may concern:*

Be it known that I, HOLGER VARDER, a subject of the King of Denmark, and resident of Baltimore, in the State of Maryland, have invented certain new and useful Improvements in Music-Leaf Turners, of which the following is a full, clear, and exact description, such as will enable those skilled in the art to which it appertains to make and use the same, reference being had to the accompanying drawings, forming part of this specification.

The invention has for its object the provision of a device whereby a musician can successively turn the leaves of his music without using his hands.

It consists in the novel construction, combination and arrangement of parts, such as will be hereinafter fully described, pointed out in the appended claims and illustrated in the accompanying drawings.

In the drawings, in which similar reference characters designate corresponding parts, Figure 1 is a front elevation of a device embodying the invention, a music book being shown in place. Fig. 2 is a side elevation, partly in section, of the device with the book removed. Fig. 3 is a horizontal sectional view. Fig. 4 is a vertical sectional view. Fig. 5 is an enlarged perspective view of the leaf clip.

The rack 1 for supporting the book or leaves may be of any construction suitable in the premises. To the underside of the shelf 2 of the rack is secured the box or casing 3 containing the folding bellows 4. One end of the bellows, as at 5, is secured to the rear wall of the box 3; and the other end, as at 6, is free to move. The movable end 6 is hinged by the pintle 7 to the rear wall of the box. Secured to the movable end 6 is the arm 8 which travels in the horizontal slot 9 in the front and end walls of the casing 3. The outer end of this arm projects a considerable distance beyond the casing and its extreme end is shaped to form the engaging finger 10.

Projecting from the end of the casing 3 is the bracket 11 and on the outer end of the latter is the support 12 curved to form an arc of a circle having the pintle 7 as a center. On the support 12 are placed the clips 13, the latter being provided with holes 14 to receive the support. On the body of the clip is pivoted the bail 15 by the hooks 16. The bail has an angular offset 17 for turning the bail when struck. The hooks 16 are of sufficient length to permit the turning of the bail without the offset 17 striking the body of the clip 13. Mounted in the opposite end of the casing 3 is the angular lever 18 pivoted on the support 19. One of the arms of this lever is longer than the other and has the detachable extension 20. This longer arm, when the extension is in place, projects through the vertical opening 21 in the casing. When the lever is turned down, as shown in Fig. 4, the shorter arm is in the path of travel of the arm 8.

Connected with the fixed end 5 of the bellows 4 is the tube 22 leading from the foot pump 23. The latter is normally held open or expanded by the spring 24. By means of the pump air is forced into the bellows to expand the same.

In the edge of the shelf 2 of the rack are the openings or recesses 25 for receiving the clips when the latter are attached to the leaves of music.

The operation of the device is as follows: As shown in Fig. 1, the music book is placed on the rack with its middle or dividing line between the leaves a short distance to the left of the pintle 7 (shown in dotted lines in this figure). Clips are attached to the lower edges of as many leaves as it is desired to turn without interruption. The clips are so placed as to register with the recess 25 on the right hand side of the shelf. When the leaves are turned the clips register with the recess 25 on the opposite side of the shelf. The clips are also placed on the support 12, which holds them in the same relative positions so that the finger 10 will register with the bail 15 when the arm 8 is turned to the right. Without this support the leaves would sag and the positions of the clips would vary so that a proper registration of the finger with the several bails could not be depended upon. When the clips are affixed to the leaves the bails are turned outwardly, in which position they are held by gravity as the rack is slightly inclined backwards. The bellows 4 is normally closed and the position of the arm 8, when the bellows is in that condition, is indicated by dotted lines in Figs. 1 and 4. When it is desired to turn the next leaf the musician presses his foot upon the pump 23 and compresses the latter against the action of the spring 24. This forces air through the tube 22 into the bellows and the latter is expanded or opened. This turns the free end 6 of the bellows on its pintle 7 and swings the arm 8 to the right. When the arm 8 approaches the limit of its stroke to the right the finger 10 on its end registers with the bail 15 as shown in Fig. 1. The finger strikes the angular offset 17 and the bail is turned inwardly over the end of the finger. The enlargement on the end of the finger holds the bail against accidental displacement. After pressing on the pump the musician immediately removes his foot and the spring 24 expands the pump and the latter operates to withdraw the air from the bellows, which returns to its normal position. This return movement of the bellows may be facilitated by placing a spiral spring on the pintle 7, but when the air pump has sufficient capacity this would not be necessary. The return movement of the bellows moves the arm 8 to the left, as shown by dotted lines in Figs. 1 and 3. As the finger of the arm is in engagement with the clip, the leaf to which the clip is attached is turned. As the arm approaches the limit of its return stroke, as the middle of the book or turning axis of the leaf is to the left of the pivotal point of the arm, the finger 10 is gradually withdrawn from the bail 15 and frees the clip and leaf near the end of the stroke. As the arm 8 continues its return movement it strikes the short member of the angular lever 18, as shown by full lines in Fig. 4. When the arm 8 engages with the short member of the angular lever, the long member is turned upwardly, as shown in dotted lines in Fig. 4, and presses the leaf against the left hand side of the book. The angular lever is held in this raised position by the arm 8 until the next movement of the latter. When the bellows is operated to turn the next leaf, in its movement to the right, the arm 8 strikes the long member of the angular lever and turns it downwards out of the path of travel of the next leaf. The detachable end of the long member of the angular member is to be removed for packing purposes.

Having thus described my invention, what I claim and desire to secure by Letters Patent is,

1. In a music leaf turner, a rack for holding sheets of music, clips to be attached to the sheets, bellows fast at one end on one side of the turning axis of the sheets and hinged at the other end on the opposite side of the turning axis of the sheets, means for forcing air into the bellows, and an arm secured to the hinged end of the bellows operating to engage the clips when the bellows are opened and to release the clips when the bellows are closed.

2. In a music leaf turner, a rack for holding sheets of music, a casing secured to said rack provided with a horizontal slot in its front and side walls, bellows contained within said casing with one end fast to the rear wall of the casing on one side of the turning axis of the sheets and hinged at the other end to the rear wall of the casing on the opposite side of the turning axis of the sheets, means for forcing air into the bellows, an arm secured to the hinged end of the bellows projecting through said horizontal slot, and clips for the sheets of music to be engaged by said arm when the bellows are opened and to be released when the bellows are closed.

3. In a music leaf turner, a casing provided with a horizontal slot in its front and side walls, bellows contained within said casing with one end fast to the rear wall thereof and the other end hinged to said rear wall, an inlet pipe communicating with the fixed end of the bellows, means for forcing air through said inlet pipe into the bellows, an arm secured at its inner end to the hinged end of the bellows and projecting through said horizontal slot, and a clip to be engaged by the outer end of said arm when the bellows are opened and to be released by said arm when the bellows are closed.

4. In a music leaf turner, a rack for supporting sheets of music, a casing secured to said rack provided with a horizontal slot in its front and side walls and with a vertical slot in its top and front walls, bellows contained within said casing with one end fast to the rear wall thereof and the other end hinged to said rear wall, means for forcing air into said bellows, an arm secured to the free end of said bellows and projecting through said horizontal slot, clips for the music sheets to be engaged by said arm when the bellows are opened and to be released when the bellows are closed, and an angular lever pivoted at its angle to said casing and projecting at one end through said vertical slot and extending at the other end into the path of travel of said arm.

5. In a music leaf turner, a clip, a bail pivoted to said clip, a swinging arm for engaging with said bail to move said clip, and means for actuating said arm.

6. In a music leaf turner, a clip, a bail pivoted to said clip and provided with an angular offset, a swinging arm operating to strike said offset to turn said bail over the end of said arm, and means for actuating said arm.

7. In a music leaf turner, a rack for supporting sheets of music, a swinging arm for turning said sheets, and an angular lever comprising long and short members pivoted at its angle with the short member extending into the path of travel of said arm and the long member operating to press the music sheets against said rack.

8. In a music leaf turner, a rack for holding sheets of music, clips to be attached to said sheets, an arm pivoted to one side of the turning axis of said sheets and operating to engage said clips on one side of the rack and to release them after the sheets are turned to the other side, and means for actuating said arm.

In testimony whereof I hereunto affix my signature in the presence of two witnesses.

HOLGER VARDER.

Witnesses:
 EUGENE D. SMITH,
 A. B. SCOWDEN.